United States Patent
Zanon

(10) Patent No.: US 8,524,017 B2
(45) Date of Patent: Sep. 3, 2013

(54) PROCESS OR MANUFACTURING COMPONENTS OBTAINED BY SINTERING OF CO-CR-MO ALLOYS HAVING IMPROVED DUCTILITY AT HIGH TEMPERATURES

(75) Inventor: Giovanni Paolo Zanon, Rivalta di Torino (IT)

(73) Assignee: AVIO S.p.A., Turin (IT)

( * ) Notice: Subject to any disclaimer, the term of this patent is extended or adjusted under 35 U.S.C. 154(b) by 190 days.

(21) Appl. No.: 12/805,314

(22) Filed: Jul. 26, 2010

(65) Prior Publication Data

US 2011/0036468 A1    Feb. 17, 2011

(30) Foreign Application Priority Data

Jul. 31, 2009    (IT) .......................... TO2009A000595

(51) Int. Cl.
| | | |
|---|---|---|
| *C21D 9/00* | (2006.01) | |
| *C22C 19/07* | (2006.01) | |
| *C22F 1/10* | (2006.01) | |
| *C22C 33/02* | (2006.01) | |
| *C21D 1/00* | (2006.01) | |
| *B22F 3/10* | (2006.01) | |

(52) U.S. Cl.
USPC ........... 148/559; 148/408; 148/425; 148/674; 419/25; 419/29; 419/53

(58) Field of Classification Search
USPC ................... 148/408, 425, 559, 674; 419/25, 419/29, 53
See application file for complete search history.

(56) References Cited

U.S. PATENT DOCUMENTS

| | | | | |
|---|---|---|---|---|
| 4,003,765 | A * | 1/1977 | Davidson | 148/501 |
| 4,923,671 | A * | 5/1990 | Aslund | 419/8 |
| 5,462,575 | A | 10/1995 | Del Corso | |
| 5,480,283 | A * | 1/1996 | Doi et al. | 415/199.5 |
| 7,300,488 | B2 * | 11/2007 | Szabo et al. | 75/252 |
| 2006/0157892 | A1 | 7/2006 | Larsson | |
| 2009/0152771 | A1 | 6/2009 | Philippi et al. | |

FOREIGN PATENT DOCUMENTS

WO    WO 2006117030    * 11/2006

OTHER PUBLICATIONS

European Search Report mailed Dec. 8, 2010 in European Application No. 10170838.6-2122.

* cited by examiner

*Primary Examiner* — Keith Walker
*Assistant Examiner* — Alexander Polyansky
(74) *Attorney, Agent, or Firm* — Davidson, Berquist, Jackson & Gowdey, LLP

(57) ABSTRACT

A process for manufacturing a component with a base of Co—Cr—Mo alloys having values of average ultimate elongation at 800° C. greater than 10% and of average yielding load at 800° C. greater than 400 MPa, comprising: obtaining a sintered component by additive sintering of powders of Co—Cr—Mo alloys containing carbides irregularly dispersed in the molten matrix; Conducting a first heat treatment on the sintered component for solubilization of the carbides at a temperature of between 1100° C. and 1300° C. for at least 2 hours to form a solubilization intermediate; and cooling the solubilization intermediate at a cooling rate at least equal to that of cooling in air to form a cooled intermediate; and conducting a second heat treatment on the cooled intermediate at a temperature of between 700° C. and 1000° C.

9 Claims, 1 Drawing Sheet

PROCESS OR MANUFACTURING COMPONENTS OBTAINED BY SINTERING OF CO-CR-MO ALLOYS HAVING IMPROVED DUCTILITY AT HIGH TEMPERATURES

The present invention relates to a process for manufacturing a component with a base of Co—Cr—Mo alloys having improved ductility at high temperatures, and in particular a component obtained by additive sintering of powders. More particularly, the present invention refers to a treatment method for optimizing the mechanical performance at a high temperature of such a component in view of its use in the aeronautics sector, for example as part of an engine, such as a gas turbine combustor.

BACKGROUND OF THE INVENTION

Co—Cr—Mo alloys are known for their excellent mechanical properties (hardness, compressive strength) and properties of resistance to corrosion, which have led to a significant diffusion thereof in the biomedical sector, above all in Europe, in particular as material for manufacturing prostheses and dental implants. In said field, the use of said alloys is regulated by the ASTM F75 and ISO 5832 standards.

However, it has been noted that the components obtained by casting Co—Cr—Mo alloys suffer, in general, from microstructural defects linked to the segregation of carbides and to the porosity of the material, which can induce phenomena of localized corrosion and a progressive decay of the mechanical properties.

In order to overcome said drawbacks, alternative manufacturing technologies have been developed, referred to as "rapid manufacturing" technologies, which are based upon additive sintering of powders.

In particular, known, for example from US2006157892, is a method for manufacturing three-dimensional components by means of electron-beam sintering of layers of powders. In addition, known for example from US2009152771 is a method for manufacturing three-dimensional components by laser sintering of powders.

In the aeronautics sector particular interest has been aroused by the possibility of employing Co—Cr—Mo alloys for Manufacturing components for which a high resistance to wear and heat is required, given the typical temperatures of use. However, so far it has not been possible to extend to the applications of the aeronautics sector the technologies based upon additive sintering of powders because the components obtained according to said processes present good hardness and mechanical properties at room temperature, but become particularly brittle when they are exposed to the high temperatures (around 800° C.) typical for the components of aeronautic engines.

In fact, the Co—Cr—Mo alloys that are potentially most promising for these applications contain, in addition to chromium and molybdenum, significant amounts of carbon. The simultaneous presence of these three elements leads to the formation of carbides, which, on the one hand, contribute to bestowing on the material high hardness and considerably good mechanical properties, but, on the other hand, cause embrittlement thereof when they precipitate at the grain boundaries. Precipitation of carbides is thermodynamically favoured precisely in the temperature range of applicational interest in the aeronautics sector.

The main users of the manufacturing systems based upon sintering of powders suggest, in order to overcome this drawback, execution of a heat treatment on the sintered components.

For example, it has been proposed to carry out, on the components obtained by means of laser sintering of powders of Co—Cr—Mo alloys, a stress-relief heat treatment at 1050° C. for two hours, having the chief purpose of minimizing the internal stresses and, hence, the strains of the components (which are undesirable, in particular, in the case of complex geometries).

However, this heat treatment reduces the properties of mechanical resistance, yielding, and ultimate elongation, since, in the course of the process of stress relief, carbides are formed at the grain boundaries. This phenomenon is particularly accentuated in the 700-1000° C. temperature range. A further increase in temperature, for example up to 1050° C., leads to a solubilization of the carbides with a reduction of the embrittling effect caused thereby, but, on the other hand, does not prevent these carbides from re-precipitating in an uncontrolled way in use. In other words, a heat treatment of this sort has proven unadvisable if the aim is to improve the mechanical properties of the components sintered from powders of Co—Cr—Mo alloys.

In addition, it should be emphasized that, in this context, there has not been taken into account the possibility of the components in use being subsequently exposed to high temperatures such as those typical in aeronautics applications.

Alternatively, it has been proposed to subject the components produced by sintering to a treatment of hot isostatic compression (known in the sector also as "HIPping", from the acronym HIP—Hot Isostatic Pressing) aimed at homogeneizing the material and reducing the brittleness thereof. There is, in fact, obtained a structurally isotropic, recrystallized material without visible carbides within the structure.

However, if, on the one hand, said treatment markedly improves the properties of ultimate elongation of the material, on the other hand, it significantly reduces the mechanical properties thereof as compared to the material as sintered material and significantly increases the production costs.

In addition, said treatment is effective to obtain dissolution of the carbides, but is unable to control the subsequent precipitation thereof when the material is exposed, in use, to high temperatures. In other words, said treatment is useful only for components that find application at relatively low temperatures and, in any case, lower than the temperature range of re-precipitation of the carbides, which is approximately between 700° C. and 1000° C.

The need is hence felt to provide a process for manufacturing a component with a base of Co—Cr—Mo alloys that will enable the drawbacks associated to the solutions known to the art to be overcome.

Furthermore, in particular in the aeronautics sector the need is felt for a process for manufacturing components with a base of Co—Cr—Mo alloys that will enable optimization of the mechanical characteristics at the temperatures of interest for aeronautics applications (up to 800° C.), in particular reducing the brittleness thereof and improving the ductility thereof and the properties of yielding at high temperatures.

SUMMARY OF THE INVENTION

The aim of the present invention is consequently to provide a process for manufacturing a component with a base of Co—Cr—Mo alloys, which will enable at least one of the aforesaid needs to be met in a simple and inexpensive way.

The aforesaid purpose is achieved by the present invention, in so far as it regards a process as claimed in the attached claims.

BRIEF DESCRIPTION OF THE DRAWINGS

For a better understanding of the present invention, a preferred embodiment is described in what follows, purely by way of non-limiting example and with reference to the attached drawings, wherein.

DETAILED DESCRIPTION OF THE INVENTION

Figure 1:
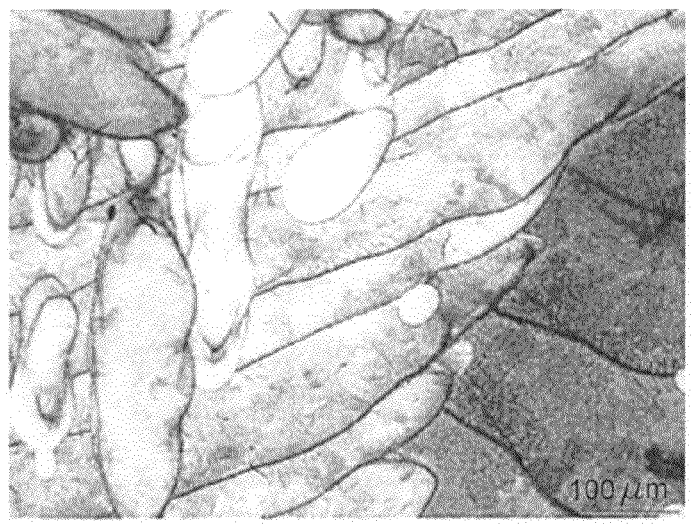
FIG. 1 is a micrograph that illustrates the morphology of a Co—Cr—Mo-alloy sintered component.

According to the method of the invention, a sintered component is in the first place obtained by means of additive sintering of powders of Co—Cr—Mo alloys, preferably by laser sintering or electron-beam sintering. The sintering operating conditions are such as to determine, given the thermodynamics of the multi-component system undergoing transformation, a molten main structure, distributed in which are carbides of the other main components of the alloy—and more in particular chromium and molybdenum carbides—resulting from an irregular and non-controlled precipitation. The microscopic structure of the sintered component is qualitatively illustrated by the micrograph of FIG. 1.

The sintered component thus obtained is then subjected to a first heat treatment for solubilization of the carbides at a temperature of between 1100° C. and 1300° C. Below 1100° C. it is not possible to obtain a dissolution of the carbides and a diffusion of the elements in the alloy that are satisfactory. On the other hand, above 1300° C. there is noted an excessive enlargement of the grain, and the likelihood of contamination of the sintered components by the walls of the furnace in which the treatment is carried out and by the tools correlated to operation of the furnace increases.

The stay time at high temperature in the course of this solubilization treatment is at least 2 hours, preferably at least 4 hours, so as to enable an adequate solubilization of the carbides and a good interdiffusion of the elements constituting the alloy.

Preferably, the sintered component is subjected to a solubilization heat treatment at a temperature of between 1200° C. and 1250° C., more preferably at a temperature close to 1220° C.

Even though the heating rate is not an essential parameter for the final characteristics of the treated material, it is preferable, in particular for sintered components having complex geometries, to perform rise in temperature with one or more stops, for example two, so as to obtain a uniform distribution of the temperature in the sintered component, consequently reducing any possibility of deformation.

From the solubilization step a solubilization intermediate is thus obtained.

According to the invention, said solubilization intermediate is then cooled at a rate at least equal to the one that can be obtained with cooling in air.

In other words, the cooling rate must be sufficiently high to prevent re-precipitation of the carbides. In practice, in order to take into account the temperatures of the solubilization heat treatment described above and the consequent thermal stresses of the treated components and of the structure of the furnace itself, it is preferable to carry out a first step of cooling in the furnace in calm air, for example down to the temperature of 1100° C., followed by a step of cooling in a flow of cooling gas.

In order to limit the oxidation phenomena, in particular in the case where overmetals to be applied above the finished components are not envisaged, it is preferable to operate in inert atmosphere (in vacuum conditions, in argon, etc.).

Figure 2:
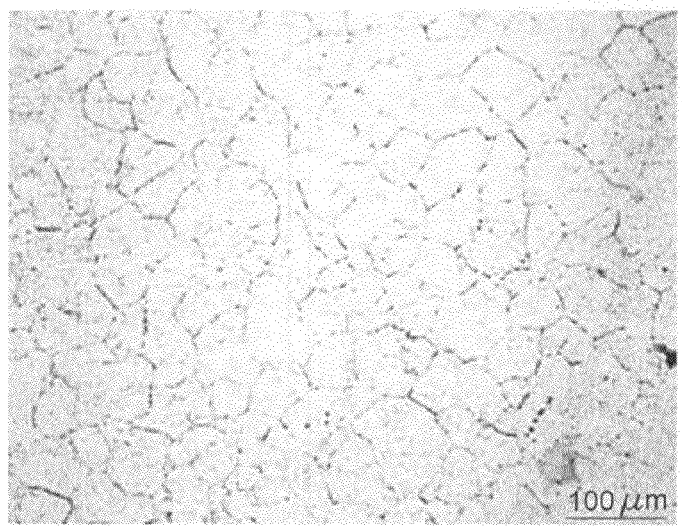
FIG. 2 is a micrograph that illustrates the morphology of the intermediate obtained by subjecting the sintered component of FIG. 1 to the treatment of steps a), b) and c) of the process of the invention (after solubilization for 4 hours at 1220° C. and cooling)

The solubilization heat treatment described above causes a deep structural modification of the material. This appears clearly from the comparison of the micrographs of FIGS. 1 and 2: FIG. 2 shows the microstructure of the cooled intermediate obtained from the sintered component of FIG. 1 after 4 hours at 1220° C.

According to the method of the invention, the cooled intermediate is then subjected to a second heat treatment, by carrying out a heating to a temperature of between 700° C. and 1000° C., preferably between 800° C. and 850° C., more preferably close to 815° C.

Advantageously, this second heat treatment causes controlled and uniform precipitation of the carbides previously dissolved in the matrix of the alloy.

The time necessary for obtaining a controlled and uniform precipitation is a function of the treatment temperature and is, in general, inversely proportional to the temperature. The duration of the second heat treatment according to the invention is hence between 5 and 15 hours, and, for optimal treatment temperatures around 815° C., is preferably approximately 10 hours.

Also for this second heat treatment, in order to limit the oxidation phenomena, it is preferable to operate in inert atmosphere (in vacuum conditions, in argon, etc.).

Figure 3:
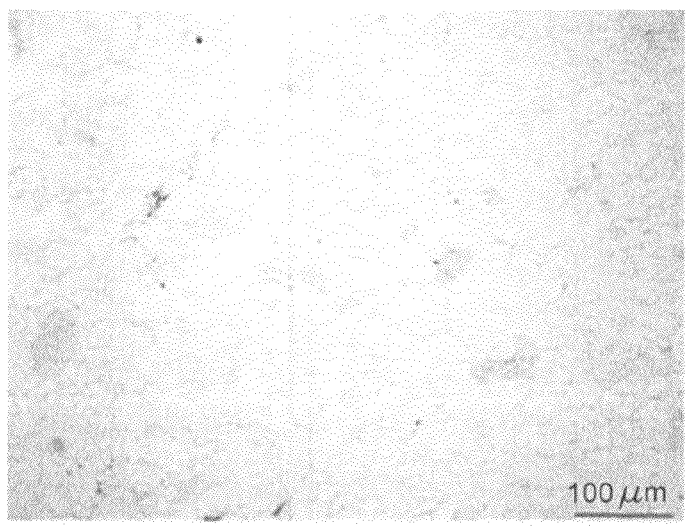
FIG. 3 is a micrograph that illustrates the morphology of the Co—Cr—Mo-alloy component at the end of step d) of the process of the invention (after solubilization for 4 hours at 1220° C., cooling, and subsequent treatment at 815° C. for 10 hours).

As may be appreciated from the micrograph of FIG. 3, the re-precipitated carbides have a high degree of fineness at a micro-structural level.

The second heat treatment is followed by a further cooling step.

The process of the invention enables a component with a base of Co—Cr—Mo alloys to be obtained having improved performance at the high temperatures of use imposed by the applications in the aeronautics sector. In particular, a component of this sort presents values of average ultimate elongation at 800° C. higher than 10% and of average yielding load at 800° C. higher than 400 MPa.

From an examination of the characteristics of the treatment method according to the present invention, and of the components obtained by means of the method itself, the advantages that the invention affords are evident.

In particular, the components obtained according to the process of the invention present a sensibly improved ductility at temperatures in the region of 800° C., as will emerge clearly from an analysis of the experimental results given below.

EXAMPLE 1

Starting from a commercially available alloy (EOS Cobalt Chrome MP1) having the composition Co=60-65%, Cr=26-30%, Mo=5-7%, C=0.16%, by means of the laser technique, cylindrical specimens having a diameter of 12 mm and a length of 100 mm were sintered.

The specimens thus obtained were subjected to the treatment method according to the invention and to measurements of the corresponding mechanical properties, at room temperature and following upon prolonged exposure to high temperature. The results of said tests were compared with those of similar tests conducted on components that had not been subjected to any heat treatment, i.e., that had been subjected only to a treatment of solubilization of the carbides and subsequent cooling according to the steps a) and b) of the method according to the invention.

In particular, Table 1 below gives the data obtained in the course of tests at room temperature according to ASTM E8M-08 for:

component I: as sintered;

component II: sintered, subjected to heat treatment for solubilization of the carbides (4 h at 1220° C.) and cooled;

component III: component II further subjected to heat treatment for controlled precipitation of the carbides (10 h at 815° C.)

TABLE 1

|  | Component I | | Component II | | Component III | |
| --- | --- | --- | --- | --- | --- | --- |
|  | mean value | standard dev. | mean value | standard dev. | mean value | standard dev. |
| $R_m$ | 1144 | 11 | 1079 | 22 | 988 | 14 |
| $R_{p0,2}$ | 714 | 40 | 581 | 19 | 727 | 26 |
| A5D | 11 | 5 | 31 | 7 | 5 | 1 |

Legend:
$R_m$ = ultimate load, expressed in MPa;
$R_{p0,2}$ = yielding load, expressed in MPa;
A5D = ultimate elongation, expressed as %.

Appearing, instead, in Table 2 below are the data obtained in the course of tests at 800° C. according to ASTM E21-05 for the same components.

TABLE 2

|  | Component I | | Component II | | Component III | |
| --- | --- | --- | --- | --- | --- | --- |
|  | mean value | standard dev. | mean value | standard dev. | mean value | standard dev. |
| $R_m$ | 441 | 54 | 487 | 15 | 532 | 14 |
| $R_{p0,2}$ | 381 | 4 | 301 | 14 | 416 | 10 |
| A5D | 5 | 1 | 21 | 3 | 12 | 5 |

Legend:
$R_m$ = ultimate load, expressed in MPa;
$R_{p0,2}$ = yielding load, expressed in MPa;
A5D = ultimate elongation, expressed as %.

There has moreover been verified the effect of exposure to high temperatures, such as the operating temperatures in the aeronautics sector, by comparing the data obtained for Component I with those obtained with the same component kept for 10 h at 815° C. (indicated in the table, for simplicity, as Component IV). The tests were conducted both at room temperature and at a high temperature (800° C.). The results are given in Table 3 below.

TABLE 3

| | Properties at room temperature | | | | Properties at 800° C. | | | |
| --- | --- | --- | --- | --- | --- | --- | --- | --- |
| | As sintered | | After 10 h at 815° C. | | As sintered | | After 10 h at 815° C. | |
| | mean value | standard dev. | mean value | standard dev. | mean value | standard dev. | mean value | standard dev. |
| $R_m$ | 1144 | 11 | 1168 | 21 | 441 | 54 | 443 | 43 |
| $R_{p0,2}$ | 714 | 40 | 812 | 33 | 381 | 4 | 356 | 37 |
| A5D | 11 | 5 | 3 | 2 | 5 | 1 | 5 | 4 |

Legend:
$R_m$ = ultimate load, expressed in MPa;
$R_{p0,2}$ = yielding load, expressed in MPa;
A5D = ultimate elongation, expressed as %.

As may be readily noted from the data appearing in Table 1, the solubilization heat treatment reduces the characteristics of mechanical resistance and yielding, but considerably improves the ductility of the material (note, in particular, the data regarding the ultimate elongation). The treatment of controlled precipitation of the carbides determines, instead, an improvement of the mechanical properties as compared to the solubilized material, even though it is possible to note a contained decrease in the data regarding ultimate elongation, which remains, however, high.

The main advantage of the method of the invention, however, emerges from an evaluation of the data of Table 2, which show a significant improvement in the characteristics of ductility and yielding at high temperatures.

It should moreover be noted (Table 3) that, in the case where the heat treatment of the invention is not carried out, the characteristics of the base material exposed to temperatures close to 800° C. are affected by a marked reduction of the values of ultimate elongation, as is also highlighted by the increase in the corresponding standard deviation.

It is clear that modifications and variations may be made to the treatment method described and illustrated herein without thereby departing from the sphere of protection of the claims.

The invention claimed is:

1. A process for manufacturing a high temperature component made from an alloy consisting essentially of 60-65% Co, 26-30% Cr and 5-7% Mo, comprising the steps of:
   a) additively sintering powders of the alloy to obtain a sintered component containing Cr and Mo carbides dispersed in a Co-based molten matrix;
   b) forming a solubilized intermediate by heat treating the sintered component at a temperature of between 1100 and 1300° C. for a treatment time of at least 2 hours;
   c) cooling the solubilized intermediate in still air to form a cooled intermediate; and
   d) heat treating the cooled intermediate at a temperature of between 700 and 1000° C.

2. The process according to claim 1, wherein the treatment time in said step b) is at least 4 hours.

3. The process according to claim 1, wherein the treatment temperature in said step b) is between 1200 and 1250 ° C.

4. The process according to claim 1, wherein said step c) of cooling comprises a first step of cooling in the furnace such as to allow the temperature to decrease below 1100° C. and a second step of cooling in a flow of cooling gas.

5. The process according to claim 1, wherein the treatment temperature in said step d) is between 800° C. and 830° C.

6. The process according to claim 1, wherein the treatment time in said step d) is between 5 and 15 hours.

7. The process according to claim 1, characterized in that said component is a part of a gas turbine combustor.

8. The process as in claim 1 wherein the cooling undertaken in step c) cools to a point that prevents re-precipitation of the Cr and Mo carbides.

9. The process as in claim 1, wherein the high temperature component has an average ultimate elongation at 800° C. greater than 10% and an average yielding load at 800° C. greater than 400 MPa.

\* \* \* \* \*